(12) United States Patent
Oh et al.

(10) Patent No.: US 8,547,505 B2
(45) Date of Patent: Oct. 1, 2013

(54) LIQUID CRYSTAL DISPLAY

(75) Inventors: Dae-Kyun Oh, Yongin (KR); Hye-Sung Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/337,668

(22) Filed: Dec. 27, 2011

(65) Prior Publication Data

US 2013/0002993 A1 Jan. 3, 2013

(30) Foreign Application Priority Data

Jul. 1, 2011 (KR) ........................ 10-2011-0065528

(51) Int. Cl.
*G02F 1/1335* (2006.01)
(52) U.S. Cl.
USPC .......................................................... 349/96
(58) Field of Classification Search
USPC .......................................................... 349/96
See application file for complete search history.

(56) References Cited

U.S. PATENT DOCUMENTS 7,508,461 B2 * 3/2009 Jeong et al. ..................... 349/12

FOREIGN PATENT DOCUMENTS

| KR | 08-095033 | | 4/1996 |
| KR | 10-2001-0045767 | A | 6/2001 |
| KR | 10-2006-0062093 | A | 6/2006 |
| KR | 10-2007-0044918 | A | 5/2007 |
| KR | 10-2008-0055068 | A | 6/2008 |

OTHER PUBLICATIONS

Machine translation of abstract of Minami Yasuo JP 61-278827.*

* cited by examiner

*Primary Examiner* — Lucy Chien
(74) *Attorney, Agent, or Firm* — Lee & Morse, P.C.

(57) ABSTRACT

A liquid crystal display (LCD) includes: a first panel having a display unit with a plurality of pixels and a non-display unit with a driving circuit to drive the pixels; a second panel facing the first panel; a liquid crystal layer between the first panel and the second panel; a transparent conductive layer at a surface of the second panel opposite to the surface of the second panel facing the first panel; and a first polarizing plate on the transparent conductive layer, the first polarizing plate including a main body unit covering a region corresponding to the display unit and an extension covering a region corresponding to a portion of the non-display unit.

9 Claims, 8 Drawing Sheets

LIQUID CRYSTAL DISPLAY

RELATED APPLICATIONS

This application claims priority to and the benefit of Korean Patent Application No. 10-2011-0065528 filed in the Korean Intellectual Property Office on Jul. 1, 2011, the entire contents of which are incorporated herein by reference.

BACKGROUND

1. Field

The described technology relates generally to a liquid crystal display (LCD).

2. Description of the Related Art

For the liquid crystal display (LCD) applied with an in-plane switching (IPS) mode and a plane to line switching (PLS) mode, it is important to effectively remove static electricity to prevent damage to an element due to the static electricity. This is because this mode of liquid crystal display (LCD) is formed with all electrodes for driving liquid crystal on one substrate among generally two substrates. As such, it is difficult to obtain a path to remove the static electricity compared with other modes of liquid crystal display (LCD).

The above information disclosed in this Background section is only for enhancement of understanding of the background of the described technology and therefore it may contain information that does not form the prior art that is already known in this country to a person of ordinary skill in the art.

SUMMARY

A liquid crystal display (LCD) according to an exemplary embodiment may include: a first panel including a display unit formed having a plurality of pixels and a non-display unit having a driving circuit to drive the pixels; a second panel facing the first panel; a liquid crystal layer between the second panel and the first panel; a transparent conductive layer at a surface of the second panel opposite a surface of the second panel facing the first panel; and a first polarizing plate on the transparent conductive layer, the first polarizing plate including a main body unit covering a region corresponding to the display unit and an extension covering a region corresponding to a portion of the non-display unit.

The first polarizing plate may include a conductive adhesive layer electrically connected to the transparent conductive layer.

The non-display unit may further include a ground pattern, and the conductive adhesive layer may electrically connect the transparent conductive layer and the ground pattern.

The extension may include the conductive adhesive layer.

The conductive adhesive layer may extend to an edge of the main body unit.

The first polarizing plate may further include a polarizing layer and an adhesive layer, the adhesive layer being disposed between the polarizing layer and the transparent conductive layer.

The first polarizing plate may further include a transparent conductive inner layer between the polarizing layer and the adhesive layer.

The conductive adhesive layer may include a conductive double-sided adhesive tape.

A liquid crystal display (LCD) according to an exemplary embodiment may include: a first panel including a display unit having a plurality of pixels and a non-display unit having a driving circuit to drive the pixels; a second panel facing the first panel; a liquid crystal layer between the second panel and the first panel; and a first polarizing plate on the second panel, the first polarizing plate including a main body unit covering a region corresponding to the display unit and an extension covering a portion of a region corresponding to a portion of the non-display unit. The first polarizing plate may include: a polarizing layer extending across the entire main body unit and the extension; a transparent inner conductive layer under the polarizing layer in the main body unit; and a conductive adhesive layer extending under the polarizing layer in the extension and electrically connected to the transparent inner conductive layer.

The first polarizing plate may further include an adhesive layer under the transparent inner conductive layer, the adhesive layer directly contacting the second panel.

DETAILED DESCRIPTION

Figure 1:
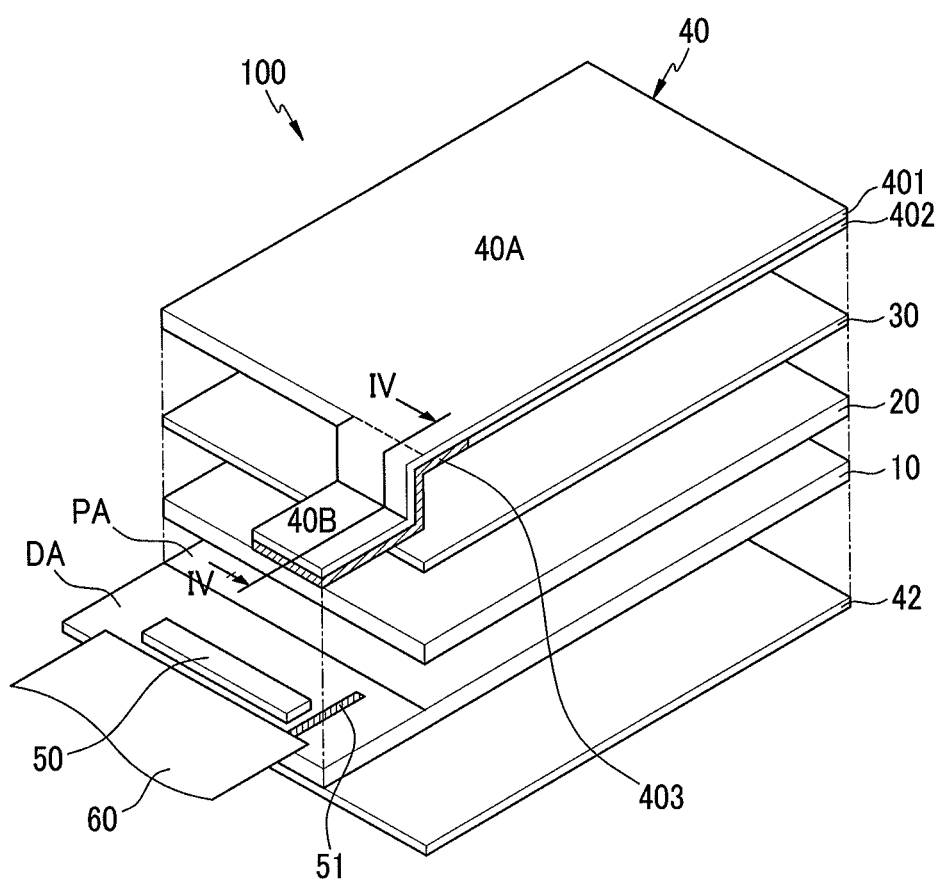
FIG. 1 illustrates an exploded perspective view of a liquid crystal display (LCD) according to the first exemplary embodiment.

Embodiments will be described more fully hereinafter with reference to the accompanying drawings, in which exemplary embodiments are shown. As those skilled in the art would realize, the described embodiments may be modified in various different ways, all without departing from the spirit or scope of the present invention.

In order to clarify the embodiments, parts or aspects of the embodiments that are not connected to or related to the inventive concept will be omitted from the description, and the same elements or equivalents are referred to as the same reference numerals throughout the specification.

The size and thickness of each element are arbitrarily shown in the drawings, and the embodiments are not necessarily limited thereto.

In the drawings, the thickness of layers, films, panels, regions, etc., are expanded for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

FIG. 1 illustrates an exploded perspective view of a liquid crystal display (LCD) according to the first exemplary embodiment.

Referring to FIG. 1, a liquid crystal display (LCD) according to embodiments may include a liquid crystal display panel 100 including a first panel 10 as a thin film transistor array panel and a second panel 20 as a color filter panel, a second polarizing plate 42 at an outer surface of, e.g., under, the first panel 10, a transparent conductive layer 30 at the outer surface of the second panel 20, e.g., on the second panel, and a first polarizing plate 40 on the transparent conductive layer 30.

The first panel 10 may include a display unit PA where a plurality of subpixels are disposed in a matrix format, and a non-display unit DA formed with a driving circuit 50 to drive each subpixel.

Figure 2:
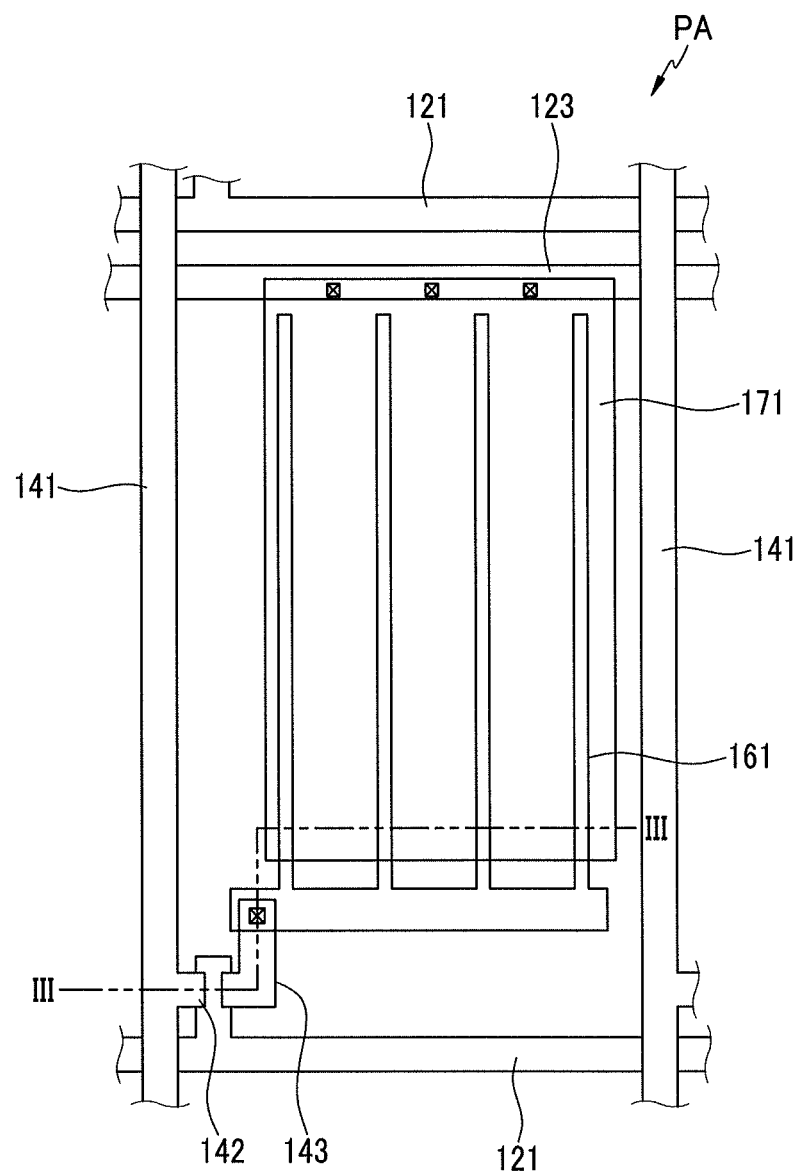
FIG. 2 illustrates a top plan view of a subpixel in the display unit PA of the liquid crystal display (LCD) shown in FIG. 1.
Figure 3:
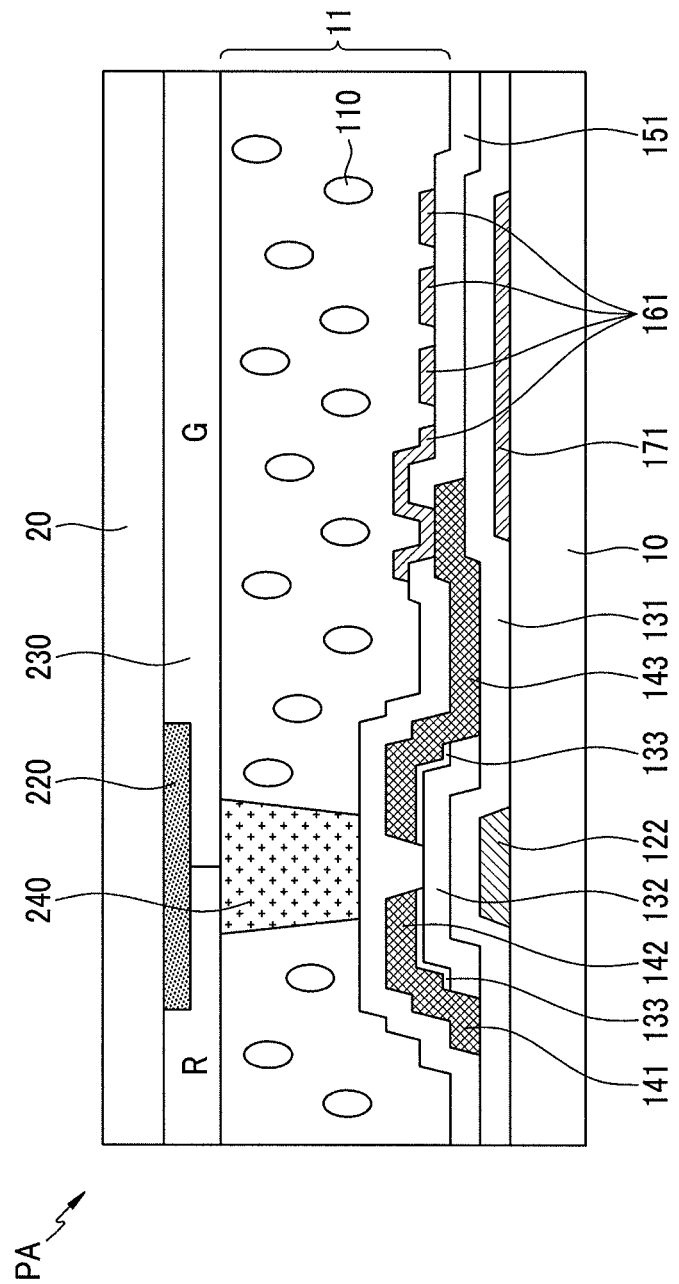
FIG. 3 illustrates a cross-sectional view taken along a line of FIG. 2.

FIG. 2 illustrates a top plan view of a subpixel of the liquid crystal display (LCD) shown in FIG. 1. FIG. 3 illustrates a cross-sectional view taken along a line III-III of FIG. 2.

Referring to FIG. 2 and FIG. 3, the liquid crystal display panel 100 may include the first panel 10 formed with a thin film transistor array, the second panel 20 facing the first panel 10 to be combined therewith, and a liquid crystal layer 11 formed between the first panel 10 and the second panel 20. In the present exemplary embodiment, a liquid crystal display panel of a vertical and horizontal electric field method as a PLS mode is described, however the embodiments are not limited thereto. The embodiments may be applied to a liquid crystal display panel in which a common electrode is not formed in the second panel 20 like the IPS mode.

A liquid crystal 110 included in the liquid crystal layer 11 may include a material having dielectric constant anisotropy and refractive index anisotropy, and may be arranged in a horizontal direction by a horizontal electric field formed between a common electrode 171 and a pixel electrode 161 of the first panel 10.

In the display unit PA of the first panel 10, a plurality of gate lines 121 and data lines 141 may intersect to form a plurality of subpixels, and a region of each subpixel where the gate line 121 and the data line 141 intersect may include a thin film transistor having a gate electrode 122, a gate insulating layer 131, a semiconductor layer 132, an ohmic contact 133, a source electrode 142, a drain electrode 143, and a protective layer 151. Here, the gate electrode 122 of the thin film transistor may be connected to the gate line 121, and the source electrode 142 may be connected to the data line 141. Also, each subpixel of the first panel 10 may be connected to the drain electrode 143 of the thin film transistor and may be formed with a plurality of pixel electrodes 161 disposed in a direction parallel to the data line 141.

Further, a common voltage line 123 may be formed on the first panel 10 parallel to the gate line 121, and each subpixel of the first panel 10 may be connected to the common voltage line 123 and may be formed with one common electrode 171 disposed substantially parallel to the pixel electrode 161 and maintaining an insulating state. In contrast to the above description, a plurality of common electrodes may be formed at predetermined intervals like the pixel electrode 161.

The pixel electrode 161 of each subpixel may receive a data signal through the data line 141. The common electrode 171 may receive the common voltage through the common voltage line 123. The pixel electrode 161 and the common electrode 171 may, thereby, form a horizontal electric field such that the liquid crystal layer 11 is driven.

The second panel 20 may be formed of a transparent substrate. The second panel may only cover the display unit PA of the first panel 10 and may expose the non-display unit DA. A black matrix 220 may be formed on one surface of the second panel 20 facing the first panel 10. Red, green, and blue color filters 230 to display a color, may be formed on the second panel 20 for the pixel and may cover the black matrix 220. A column spacer 240 may extend between the first panel 10 and the second panel 20 to maintain the interval between the first panel 10 and the second panel 20. The column spacer 240 may be disposed at a position corresponding to the black matrix 220 between the first panel 10 and the second panel 20. In the present exemplary embodiment, opposing ends of the column spacer 240 may support the protective layer 151 and the color filter 230, however, the structure of the column spacer is not limited thereto.

Again referring to FIG. 1 and FIG. 2, in the non-display unit DA of the first panel 10, the driving circuit 50 for driving each pixel is formed by supplying the control signal and the data signal to the gate line 121 and the data line 141. The driving circuit 50 may be manufactured as an integrated circuit (IC). An input terminal (not shown) and an output terminal (not shown) of the driving circuit 50 may be provided on the first panel 10. The input terminal of the driving circuit 50 may be connected to a flexible printed circuit (FPC) 60, and the output terminal thereof may be connected to the gate line 121 and the data line 141. As described above, the flexible printed circuit (FPC) 60, connected to the input terminal of the driving circuit 50, may be connected to an external flexible printed circuit (FPC) (not shown), thereby transmitting the control signal and the data signal from the external flexible printed circuit (FPC) to the driving circuit 50.

Figure 4:
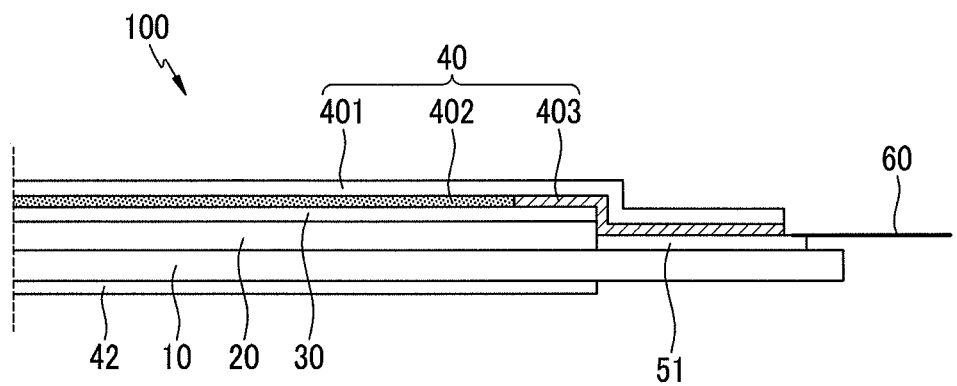
FIG. 4 illustrates a cross-sectional view of an assembled state of the liquid crystal display (LCD), taken along a line IV-IV of the LCD shown in FIG. 1.

FIG. 4 illustrates a cross-sectional view of an assembled state of the liquid crystal display (LCD), taken along a line IV-IV of the liquid crystal display (LCD) shown in FIG. 1.

Referring to FIG. 1 and FIG. 4, the liquid crystal display (LCD), according to embodiments, may include the transparent conductive layer 30 at the outer surface of the second panel 20 of the liquid crystal display panel 100, e.g., the surface opposite to the surface of the second panel 20 facing the first panel 10. The transparent conductive layer 30 may be electrically connected to a discharge wire formed in the first panel 10 or the flexible printed circuit (FPC) 60 by a conductive adhesive layer 403, described below. As such, the static electricity flowing into the second panel 20 from the outside may be discharged.

The transparent conductive layer 30 may include a material selected from tin oxide (TO), indium zinc oxide (IZO), and indium tin oxide (ITO). Also, the transparent conductive layer 30 may include the same material as the common electrode 171.

Referring to FIG. 1 and FIG. 4, the liquid crystal display (LCD) according to embodiments may include the first polarizing plate 40 formed on the transparent conductive layer 30. The first polarizing plate 40 may have a main body unit 40A that covers an entire region corresponding to position of the display unit PA of the first panel 10 and an extension 40B that covers a portion of the non-display unit DA of the first panel 10. In detail, the extension 40B may cover a ground pattern 51 formed at the non-display unit DA of the first panel 10. Also, the second polarizing plate 42 may be formed at the outer surface of the first panel 10, e.g., the surface opposite to the surface of the first panel 10 facing the second panel 20. The second polarizing plate 42 may only cover the region corresponding to the display unit PA of the first panel 10.

The first polarizing plate 40 may include a polarizing layer 401, an adhesive layer 402, and a conductive adhesive layer 403. The adhesive layer 402 and the conductive adhesive layer 403 may be provided at a surface of the polarizing layer 401 facing the transparent conductive layer 30, i.e., between the polarizing layer 401 and the transparent conductive layer 30. The adhesive layer 402 may be formed substantially at the region corresponding to the main body unit 40A. The conductive adhesive layer 403 may be formed at the region corresponding to the portion of the main body unit 40A contacting the extension 40B, i.e., a periphery of the main body unit 40A, and to the extension 40B. For example, the adhesive layer 402 may extend within a central first portion of the main body unit 40A and the conductive adhesive layer 403 may extend within a second portion of the main body unit 40A and the extension 40B. The second portion of the main body unit 40A may be smaller than and in the periphery of the first portion of the main body unit 40A.

According to an implementation, as shown in FIG. 4, the conductive adhesive layer 403 may be formed through the region from the end of the transparent conductive layer 30 to the ground pattern 51 of the first panel 10. As such, the transparent conductive layer 30 and the ground pattern 51 may be electrically connected. The area of the main body unit 40A in which the conductive adhesive layer 403 may be formed is not limited if the transparent conductive layer 30 and the ground pattern 51 are electrically connected.

The static electricity that may flow into the second panel 20 from the outside may be exhausted to the ground pattern 51 from the transparent conductive layer 30 through the conductive adhesive layer 403. Also, the static electricity that may be exhausted to the ground pattern 51 may be transmitted outside of the liquid crystal display panel 100, for example, through a ground part formed in the flexible printed circuit (FPC) 60, a bezel (not shown), a backlight module (not shown), or an implementation (not shown) of the liquid crystal display (LCD) including a metallic material, before being completely removed.

The conductive adhesive layer 403 may be an adhesive layer that may include a conductive material, e.g., aluminum (Al). The conductive adhesive layer 403 may not be limited to the materials specifically described herein, and, for example, may include a conductive double-sided adhesive tape.

The adhesive layer 402 may be used to adhere a conventional polarizing plate. The adhesive layer 402 may include, for example, an adhesive including a resin, e.g., polyurethane.

According to the first exemplary embodiment, the electrical connection of the transparent conductive layer 30 and the ground pattern 51 may be facilitated by the conductive adhesive layer 403 formed at the first polarizing plate 40, which extends throughout the extension 40B to the ground pattern 51 of the non-display unit DA, and may facilitate efficient removal of the static electricity of the liquid crystal display (LCD) by a simple process. For example, a conductive connection including a conductive material, such as silver (Ag), may not be additionally formed, and the first polarizing plate 40, only having the conductive adhesive layer 403, may cover the transparent conductive layer 30 and the ground pattern 51.

Accordingly, a process including correctly aligning and coating the conductive material to correspond to the ground metal pattern may not be necessary. Further, a test process confirming whether the connection is normal after coating the conductive material may not be necessary. As such, the manufacturing process of the liquid crystal display (LCD) may be simplified.

Also, a conductive material, separately formed from the first polarizing plate 40, may not be provided such that the defects that may be generated when the conductive material is formed, e.g., having different heights from the elements of the liquid crystal display (LCD), may be prevented.

Figure 5A:
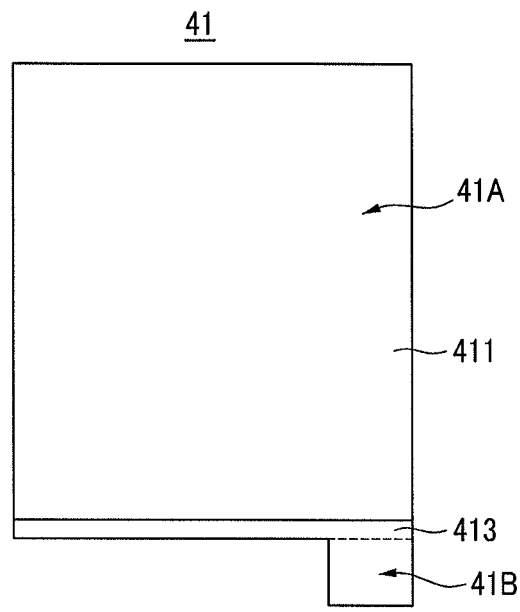
FIG. 5A and FIG. 5B illustrates top plan views of the first polarizing plate according to a variation of the first exemplary embodiment.
Figure 5B:
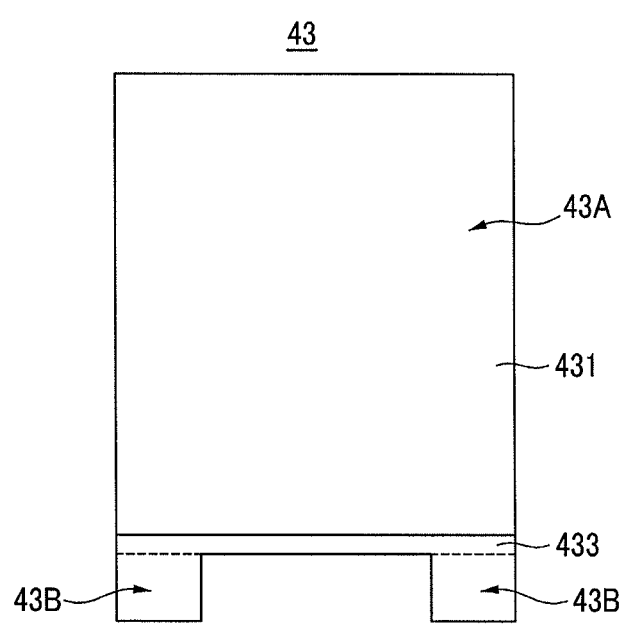

FIG. 5A and FIG. 5B illustrate top plan views of the first polarizing plate according to a variation of the first exemplary embodiment, showing an adhesive layer and a conductive adhesive layer of the first polarizing plate.

In the polarizing plate 41 shown in FIG. 5A, a portion of a conductive adhesive layer 413 extending from an adhesive layer 411 may be reversed (with respect to a right and left reference) relative to that of the above-described first exemplary embodiment. For example, the conductive adhesive layer 413 may extend from a left or right side of the adhesive layer 411. In the polarizing plate 43 shown in FIG. 5B, a conductive adhesive layer 433 may extend from both sides of an adhesive layer 431. Regarding FIG. 5A and FIG. 5B, it should be understood that a solid line between the adhesive layer (411 and 431) and the conductive adhesive layer (413 and 433) indicates boundaries, and the dotted line indicates boundaries of the main body unit (41A and 43A) and the extension (41B and 43B).

As described above, through the first exemplary embodiment and the variation thereof, when the ground pattern 51 is formed at one position, or two or more positions of the non-display unit DA, the extension of the first polarizing plate, and the conductive adhesion part corresponding thereto may be configured to cover the ground pattern, or ground patterns 51, accordingly. For example, the extension of the first polarizing plate, and the conductive adhesion part corresponding thereto may be configured to cover various ground patterns of varying number.

Figure 6A:
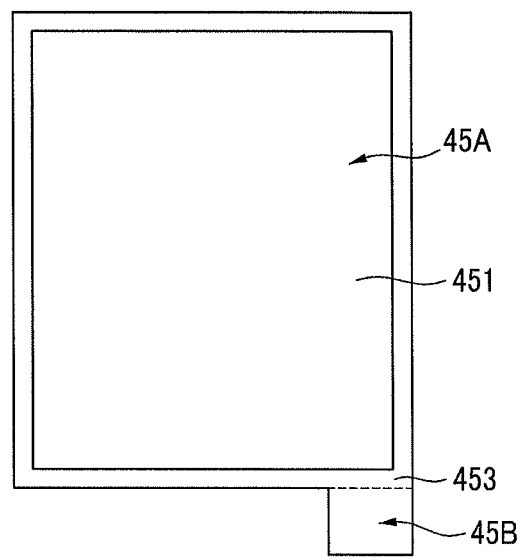
FIG. 6A to FIG. 6C illustrates top plan views of the second exemplary embodiment and a variation of the first polarizing plate according thereto.
Figure 6B:
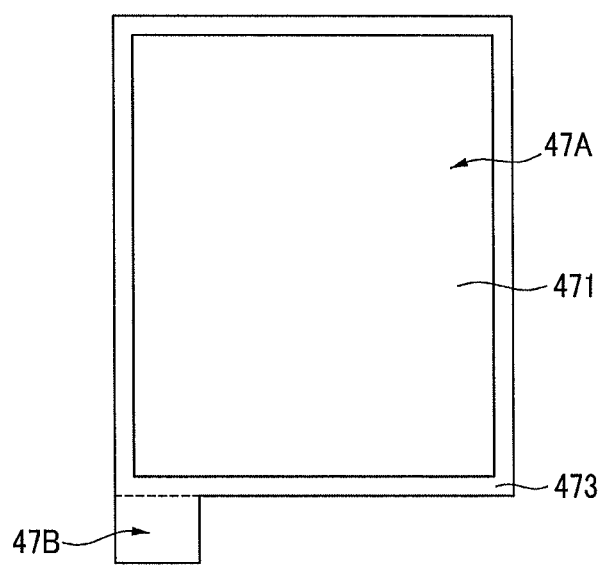
Figure 6C:
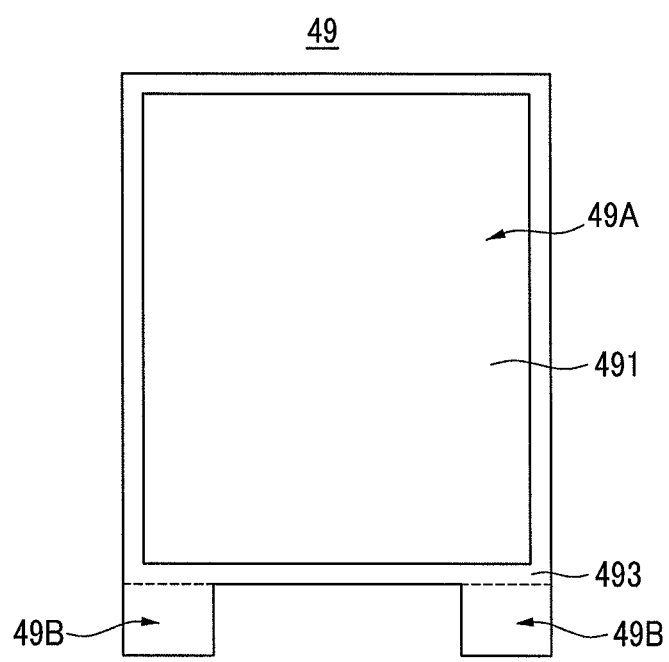

FIG. 6A illustrates a top plan view of a first polarizing plate 45 according to the second exemplary embodiment. FIG. 6B and FIG. 6C illustrate top plan views of a first polarizing plate (47 and 49), according to variations of the second exemplary embodiment.

Like the above-described examples, FIG. 6A to FIG. 6C illustrate views of the adhesive layer and the conductive adhesive layer of the first polarizing plate, wherein the solid line between an adhesive layer (451, 471, and 491) and a conductive adhesive layer (453, 473, and 493) represents the boundary therebetween, and the dotted line represents the boundary between a main body unit (45A, 47A, and 49B) and an extension (45B, 47B, and 49B).

Referring to FIG. 6A to FIG. 6C, in accordance with the second exemplary embodiment and the variations thereof, the conductive adhesive layer (453, 473, and 493) may be formed to extend to an edge, e.g., peripheral edge, of the main body unit (45A, 47A, and 49A) of the first polarizing plate (45, 47, and 49). In detail, the conductive adhesive layer may extend around an entire periphery of the main body unit. According to these configurations, the static electricity flowing from the outside, e.g., exterior of the first polarizing plate, may be transmitted faster in various directions, compared with the time required to transmit static electricity from the transparent conductive layer 30 to the conductive adhesive layer (453, 473, and 493). As such, removal of the static electricity may be more efficient, according to various embodiments. Further, the extension and the portion of the conductive adhesive layer corresponding thereto may be variously formed according to the number of ground patterns to cover the ground pattern(s) similar to the above-described example.

Figure 7:
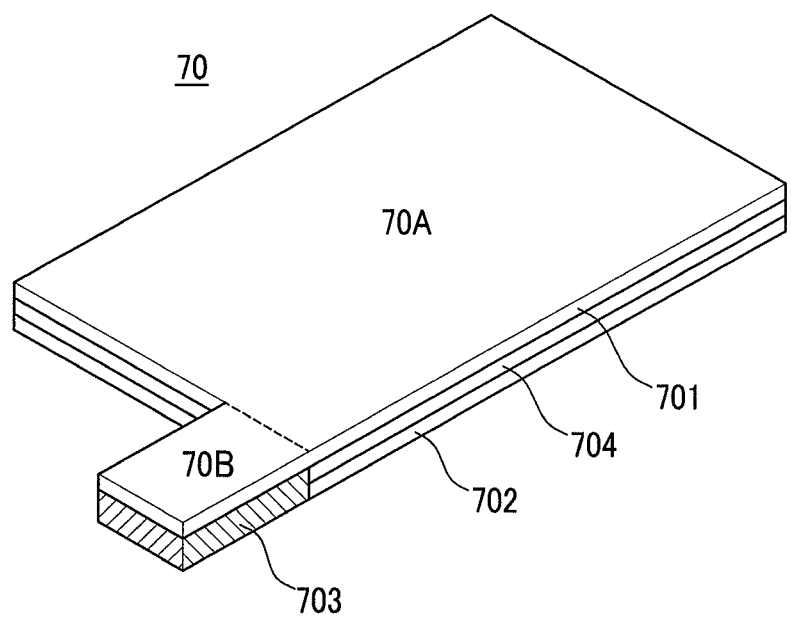
FIG. 7 illustrates a perspective view of the first polarizing plate according to the third exemplary embodiment.

FIG. 7 illustrates a perspective view of a first polarizing plate 70 according to the third exemplary embodiment.

Referring to FIG. 7, the first polarizing plate 70 according to the third exemplary embodiment may generally include a polarizing layer 701, an adhesive layer 702, and a conductive adhesive layer 703, like the first polarizing plate of the above described examples. The first polarizing plate 70 may further include a transparent inner conductive layer 704 disposed between the polarizing layer 701 and the adhesive layer 702. The transparent inner conductive layer 704 may be formed at the region corresponding to a main body unit 70A of the first polarizing plate 70. This transparent inner conductive layer 704 may be electrically connected to the conductive adhesive layer 703 formed at an extension 70B of the first polarizing plate 70. The adhesive layer 702 may be formed under the transparent inner conductive layer 704, like the first polarizing plate of the above-described examples.

With the liquid crystal display (LCD) including the first polarizing plate 70, the static electricity transmitted from the outside, e.g., exterior of the LCD, may be removed by the transparent inner conductive layer 704 such that the transparent conductive layer 30 shown in FIG. 1 and FIG. 4 may be omitted if necessary. For example, the adhesive layer 702 may directly contact the second panel 20 shown in FIG. 1 and FIG. 4, thereby adhering the first polarizing plate 70 to the second panel 20.

One or more embodiments may provide a liquid crystal display (LCD) that may easily eliminate static electricity. The liquid crystal display (LCD), according to one or more embodiments, may easily remove static electricity by the conductive adhesive layer formed at the polarizing plate. Accordingly, damage to elements by the static electricity may be prevented, the manufacturing process may be simplified, and defects generated in the manufacturing process may, simultaneously, be prevented.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD), comprising:
a first panel including a display unit having a plurality of pixels and a non-display unit having a driving circuit to drive the pixels;
a second panel facing the first panel;
a liquid crystal layer between the second panel and the first panel;
a transparent conductive layer at a surface of the second panel opposite a surface of the second panel facing the first panel; and
a first polarizing plate on the transparent conductive layer, the first polarizing plate including a main body unit covering a region corresponding to the display unit, an extension covering a region corresponding to a portion of the non-display unit, and a conductive adhesive layer electrically connected to the transparent conductive layer.

2. The liquid crystal display (LCD) of claim 1, wherein the non-display unit further includes a ground pattern, and the conductive adhesive layer electrically connects the transparent conductive layer and the ground pattern.

3. The liquid crystal display (LCD) of claim 1, wherein the extension includes the conductive adhesive layer.

4. The liquid crystal display (LCD) of claim 3, wherein the conductive adhesive layer extends to an edge of the main body unit.

5. The liquid crystal display (LCD) of claim 1, wherein the first polarizing plate further includes a polarizing layer and an adhesive layer, the adhesive layer being disposed between the polarizing layer and the transparent conductive layer.

6. The liquid crystal display (LCD) of claim 5, wherein the first polarizing plate further includes a transparent conductive inner layer between the polarizing layer and the adhesive layer.

7. The liquid crystal display (LCD) of claim 1, wherein the conductive adhesive layer includes a conductive double-sided adhesive tape.

8. A liquid crystal display (LCD), comprising:
a first panel including a display unit having a plurality of pixels and a non-display unit having a driving circuit to drive the pixels;
a second panel facing the first panel;
a liquid crystal layer between the second panel and the first panel; and
a first polarizing plate formed on the second panel, the first polarizing plate including a main body unit covering a region corresponding to the display unit and an extension covering a region corresponding to a portion of the non-display unit,
wherein the first polarizing plate includes:
a polarizing layer extending across the entire main body unit and the extension;
a transparent inner conductive layer formed under the polarizing layer in the main body unit; and
a conductive adhesive layer extending under the polarizing layer in the extension and electrically connected to the transparent inner conductive layer.

9. The liquid crystal display (LCD) of claim 8, wherein the first polarizing plate further includes an adhesive layer under the transparent inner conductive layer, the adhesive layer directly contacting the second panel.

\* \* \* \* \*